UNITED STATES PATENT OFFICE.

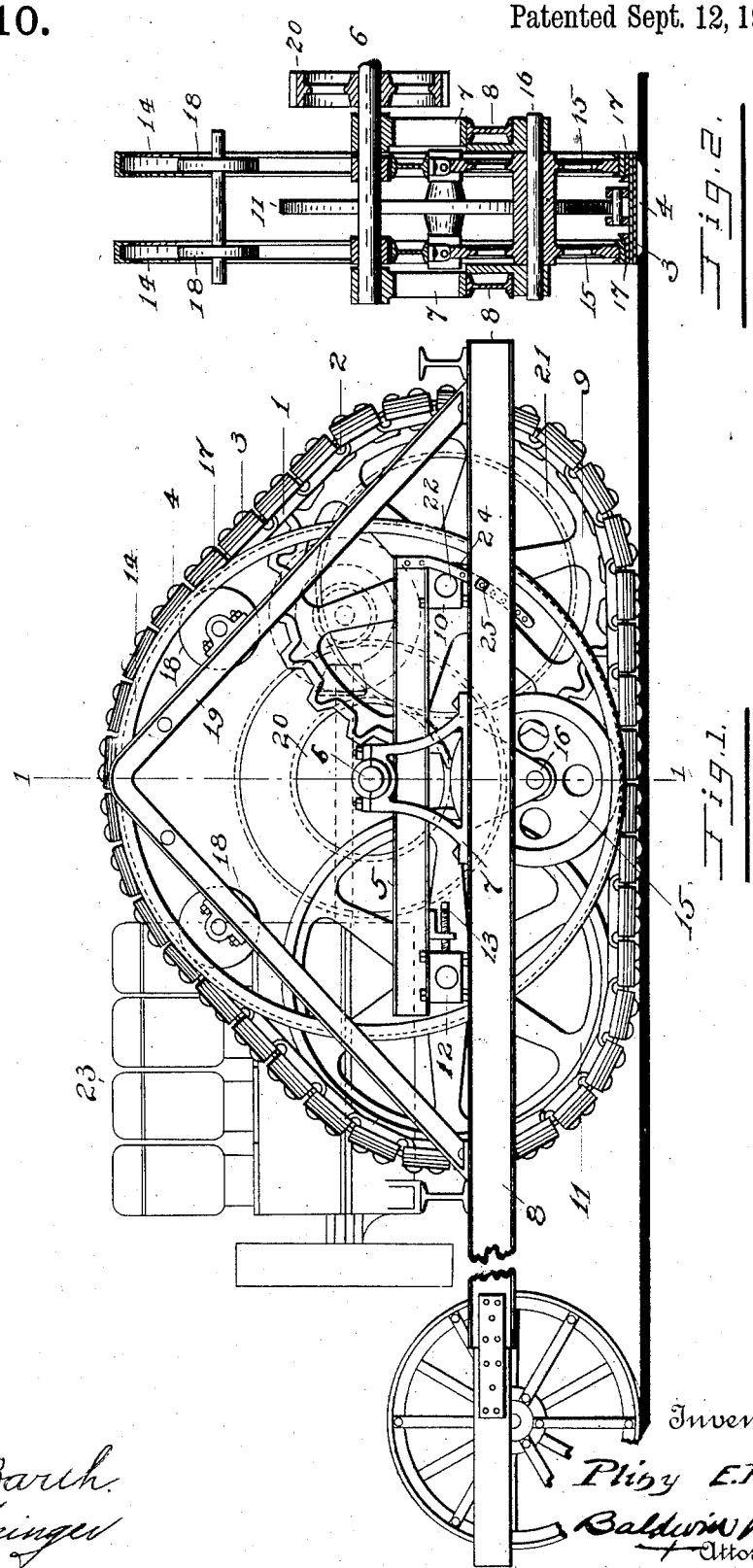

PLINY E. HOLT, OF STOCKTON, CALIFORNIA.

TRACTOR.

1,003,110.  Specification of Letters Patent.  Patented Sept. 12, 1911.

Application filed February 1, 1909. Serial No. 475,515.

*To all whom it may concern:*

Be it known that I, PLINY E. HOLT, a citizen of the United States, and residing in the city of Stockton, county of San Joaquin, and State of California, have invented certain new and useful Improvements in Tractors; and I do hereby declare the following to be a full, clear, and exact description of the said invention, such as will enable others skilled in the art to which it most nearly appertains to make, use, and practice the same.

This invention relates to improvements in tractors, and more particularly to the traction mechanisms thereof; and consists in the novel construction and arrangement of the parts hereinafter described.

The objects sought to be accomplished are to obtain the maximum traction surface in contact with the ground; to place the journals of the driving and supporting wheels so far as practicable from the ground to avoid the dust and grit of the roadway; and to eliminate the multiplicity of small supporting rollers usually present in this class of traction mechanisms.

In this class of tractors wherein the traction belt is actuated by the rear supporting and driving sprocket, it has been the practice heretofore to draw the traction belt under a series of small supporting rollers journaled in a supporting truck. The use of these small rollers is particularly objectionable when traveling over sandy wastes, or through mud, or under other bad conditions where the traction belt is working under the greatest possible disadvantage. Again, these small rollers which support the weight of the tractor on the traction belt are often submerged in water, or their journals are subjected to excessive grit because of their proximity to the ground. To overcome this latter difficulty the low roller truck is here superseded by a high truck with relatively large rollers, and rings, whose diameter overlaps the diameter of the large rollers, so disposed that their peripheral contact with the traction belt is practically equal in effect to a multiplicity of small rollers.

Broadly, the invention consists of a tractor frame; an endless link belt provided with transverse traction sections of suitable width; a teeterable truck pivoted on the tractor frame; a driving sprocket and an idle sprocket of sufficient diameter mounted in opposite ends of the teeterable truck, and around which the traction belt is adapted to travel; a pair of annular rings, set within the loop of the traction belt, whose diameter is disposed so as to overlap the diameter of the end sprockets and whose periphery is interposed between the traction belt and pivotal rollers mounted on the tractor frame, whereby the said rings rest upon that portion of the traction belt under traction, and whereby the said rings support that portion of the traction belt not under traction; a set of idle rollers mounted in the superstructure on the tractor frame adapted to guide the said rings in their rotation; means for preventing the teeterable truck from teetering; and a suitable motive mechanism geared to said driving sprocket.

In the drawings: Figure —1— is a side elevation of a traction mechanism drawn to illustrate this invention. Fig. —2— is a detail in a vertical cross section, on the line I—I of Fig. —1—, of the traction belt and its driving and supporting mechanism.

In the following description the term "tractor" will be understood to define a complete locomotive machine; the term "traction mechanism" will define that portion of the tractor intimately associated with the traction belt; the term "motive mechanism" will define the motive unit and the intermediate driving mechanisms. The traction mechanism comprises the traction belt, the driving sprocket, the teeterable truck, the pivotal rollers journaled in the tractor frame, the idle sprocket in the forward end of the teeterable truck, and the annular rings set within the loop of the traction belt.

In detail the construction consists of the traction belt comprising the links #1, joined by the pins #2, and surmounted by the transverse traction sections #3, preferably composed of a plate of sheet steel having the grousers #4 struck up from the body thereof. The teeterable truck is composed of the side beams #5 pivoted on the driving shaft #6 journaled in the pillow blocks #7 fixed on the side beams #8 of the tractor frame. The driving sprocket #9 is journaled in the boxes #10 fixed on the rear ends of the side beams #5 of the teeterable truck. The idle sprocket #11 (which may or may not be provided with sprocket teeth) is similarly journaled in the boxes #12 slidably mounted on the forward ends of the side beams #5 of the teeterable truck, and is provided with the adjusting screw #13 for taking up the slack of the traction belt. The annular rings #14 are preferably composed of a piece of channel iron with the flanges rolled inward to form a grooved runway for the rollers #15. The rollers #15 are journaled in brackets #16 fixed to and extending downward from the side beams #8 of the tractor frame. The annular rings are located on each side of the teeterable truck, and so disposed that their diameter overlaps the diameter of the sprockets mounted in the ends of the teeterable truck.

The traction belt passes from the driving sprocket #9, up over the top of the annular rings, thence downwardly around and under the idler #11, thence under the annular rings, back to the driving sprocket. The weight of the slack portion of the traction belt is supported by the annular rings, and the weight of the tractor rests upon and is supported by that portion of the traction belt under traction. The lateral edges of the traction belt are provided with the angle sections #17, upon which the annular rings are adapted to travel. The angle sections prevent lateral displacement of the traction sections in traveling on a side hill, or in passing over obstructions. Particular attention is drawn to the advantage of placing these annular rings so that they bear upon the extreme outer edges of the traction sections. Such a construction results in a more direct placing of the weight of the tractor on the traction sections, relieves the connecting gudgeon pins #2 in the belt of considerable weight, and at the same time prevents the twisting of the traction belt when the tractor is traveling on side hills, or is passing over obstructions. To prevent "threshing" or unsteadiness of the annular rings when the tractor is in motion they are guided by the idlers #18 mounted on the superstructure #19 built upon the tractor frame.

The driving sprocket #9 is driven by the pinion #20 fixed upon the driving shaft #6 and meshed with the spur gear #21, indicated in dotted circumference, and fixed upon the sprocket shaft #22. The driving pinion is actuated through a train of reducing gears by the motor #23.

By interposing the rings #14 a multiplicity of small rollers and their troublesome journals are eliminated. The large diameter of the rings and sprockets, in conjunction with the long links of the traction belt gives a sufficient backing to maintain the belt on a substantially even traction plane. A single ring may be used on light constructions; but for steadiness and equipoise a plurality of rings as shown is preferable.

It is the function of the teeterable frame to relieve the strain on the traction mechanism, in starting up or down grades, or in passing over obstructions. In towing plows, scrapers or the like, the efficiency of which might depend upon maintaining the tractor on an even plane, the truck can be prevented from teetering by locking the arm #24 in any suitable manner to the tractor frame at #25.

For the sake of lucidity, only the barest essential elements of the invention have been incorporated in this application, and all details relating to the application of the invention to special purposes, the details of motive power and of power transmission, control of the machine, fuel storage, lubrication, et cetera, have been purposely omitted. It is obvious that the traction mechanism herein described may be located upon both sides of the tractor; or that it may be upon one side only, in which case the ordinary concentric traction-wheel can be used on the other side; or that the traction mechanism may be located in the center of the tractor; or that various minor changes may be made without departing materially from the spirit of the invention, for which this application for patent is drawn particularly with reference to the construction and arrangement of the traction mechanisms.

Having thus described this invention what is claimed and desired to be secured by Letters Patent is:—

1. In a tractor, a traction mechanism consisting of a tractor frame with a superstructure built thereon; a teeterable truck pivoted on the tractor frame; a driving sprocket and an idle sprocket journaled in opposite ends of the teeterable truck; supporting rollers on opposite sides of the teeterable truck journaled in brackets on the tractor frame; annular rings of channel section in which the said rollers are adapted to travel, so disposed that their diameter overlaps the diameter of the driving and the idle sprockets, and guided by rollers mounted in the superstructure; an endless traction belt adapted to travel from the driving sprocket over the top of the annular rings, thence around said idle sprocket and thence under the annular rings back to the driving sprocket, or vice versa; suitable means for preventing the teetering of the teeterable truck; and suitable means for actuating the said driving sprocket.

2. In a tractor, a traction mechanism consisting of a tractor frame; a teeterable truck pivoted on the tractor frame; a driving sprocket and an idle sprocket journaled in opposite ends of the teeterable truck; supporting rollers on opposite sides of the teeterable truck journaled in brackets on the tractor frame; an endless traction belt encircling the teeterable truck and sprockets; annular rings with their circumference within the loop of the traction belt interposed between the supporting rollers and the traction belt, and so disposed that their diameter overlaps the diameter of the said sprockets, and a suitable driving mechanism.

3. In a tractor, a traction mechanism consisting of a tractor frame; a teeterable truck pivoted on the tractor frame; a driving sprocket and an idle sprocket journaled in opposite ends of the teeterable truck; supporting rollers on opposite sides of the teeterable truck journaled on the tractor frame; an endless traction belt encircling the teeterable truck and the said sprockets; annular rings interposed between the supporting rollers and the traction belt, and so disposed that their diameter overlaps the diameter of the said sprockets; and a suitable driving mechanism.

4. A traction mechanism comprising a tractor frame, a truck mounted on said frame, sprockets journaled in opposite ends of said truck, supporting rollers journaled in said frame, annular rings guided by said rollers and disposed on opposite sides of said sprockets, an endless traction belt engaging said sprockets and said rings, and means for driving one of said sprockets.

5. In a tractor, a traction mechanism consisting of a tractor frame; an endless traction belt with angle sections adjacent to the lateral edges thereof; supporting rollers mounted on the tractor frame; annular rings interposed between said rollers and the angle sections on the traction belt; and a suitable driving mechanism.

6. A traction mechanism comprising a tractor frame, a teeterable truck mounted therein, idlers mounted in said truck, annular rings rotatably mounted in said frame, a traction belt encircling said idlers and rings, and means for driving said belt.

7. In a tractor, a traction mechanism consisting of a tractor frame, an endless traction belt, a driving sprocket therefor, annular rings disposed on opposite sides of said sprocket, each supporting one edge of one stretch of said belt, supporting rollers for said rings, and means for driving said sprocket, the edges of said belt being provided with means for preventing lateral displacement with relation to said rings.

In testimony whereof, I have hereunto set my hand this 16th day of January 1909.

PLINY E. HOLT.

Witnesses:
W. A. BARTH,
ELLA CHISHOLM,
R. S. SPRINGER.